(12) United States Patent
Kato

(10) Patent No.: US 6,386,084 B1
(45) Date of Patent: May 14, 2002

(54) METHOD FOR CUTTING SUBSTRATE

(75) Inventor: Naoki Kato, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/492,331

(22) Filed: Jan. 27, 2000

(30) Foreign Application Priority Data

Jan. 28, 1999 (JP) .......................... 11-019343
Jan. 28, 1999 (JP) .......................... 11-019344

(51) Int. Cl.[7] ............................... B26D 3/08
(52) U.S. Cl. ................... 83/880; 83/879; 83/39
(58) Field of Search .................. 83/881, 886, 35, 83/39, 36, 880, 879; 225/96

(56) References Cited

U.S. PATENT DOCUMENTS

| | | | | |
|---|---|---|---|---|
| 3,880,028 A | * | 4/1975 | Frederick, Jr. ................. 83/7 |
| 4,226,153 A | * | 10/1980 | Insolio ........................ 83/881 |
| 4,392,404 A | * | 7/1983 | Schwarzenberg et al. ...... 83/886 |
| 5,038,654 A | * | 8/1991 | Mackey ...................... 83/880 |
| 5,381,713 A | * | 1/1995 | Smith ......................... 83/881 |
| 5,860,349 A | * | 1/1999 | Takeda ........................ 83/881 |
| 6,021,696 A | * | 2/2000 | Inao ............................ 83/13 |
| 6,105,483 A | * | 8/2000 | Takeda ........................ 83/881 |

* cited by examiner

Primary Examiner—Kenneth E. Peterson
Assistant Examiner—Omar Flores-Sánchez
(74) Attorney, Agent, or Firm—Fitzpatrick, Cella, Harper & Scinto

(57) ABSTRACT

A method for cutting a substrate by scribing a scribe line in the substrate, wherein a working condition of the scribe line is varied during the scribing of one line.

2 Claims, 4 Drawing Sheets

METHOD FOR CUTTING SUBSTRATE

BACKGROUND OF THE INVENTION

1. Field of the Invention

The present invention relates to a method for producing color filters used mainly in flat panel displays such as liquid crystal displays or the like and, more particularly, to a method for cutting a substrate.

2. Related Background Art

The conventional color filters used mainly in the flat panel displays such as the liquid crystal displays or the like were produced by a pigment dispersion method. As against it, a method by ink jet was proposed recently as a method for producing the color filters, which was able to improve the device cost and throughput. These color filter producing methods employed a so-called multiple production process of forming a plurality of color filters on a single substrate and cutting the substrate into individual color filters at a relatively late stage in the production process, thereby improving the productivity. In this case, the cutting of the color filter substrate was carried out by a scribe method conventionally known. It was common practice to carry out scribe working while maintaining working conditions constant in working of one scribe line from beginning to end. For scribing vertical and horizontal scribe lines, the scribe working conditions were constant regardless of their scribe directions.

Incidentally, in the case of the color filters produced by the ink jet method, there were cases wherein in the working under the ordinary constant conditions creation of a median crack became instable, particularly, at a cross point of intersection between scribe lines, or the like, thereby resulting in decreasing the yield.

This is conceivably due to the following reason.

Specifically, the color filters by the ink jet method, when produced by cutting of the color filter substrate, are different in the film structure at the part of a cut line from the color filters by the conventional pigment dispersion method. Describing this in more detail, only a protective film layer is present at the cut line in most cases of the cutting of the color filters by the conventional pigment dispersion method, whereas there exist two-layered films, an ink receiving layer and a protective film layer, in the case of the color filters by the ink jet method.

For this reason, in the working under the ordinary constant conditions there are cases wherein a cutter jump occurs upon a scribing start because of a chamfer shape at the edge of the substrate or at the cross point between vertical and horizontal scribe lines so as to cause a scribe cutter to run onto the film and a considerable time is thus necessary before restart of creation of the median crack. This makes the scribe line instable, for example, causing oblique rupture from the cross point or the like. This is assumed to cause the decrease of the yield.

According to further studies, there also arose the problem of the decrease of yield due to the oblique rupture or the like similarly in the case of the color filters by the pigment dispersion method, though there was a difference between their degrees.

This technique is also effective for increasing the working yield not only for color filters but for array substrate or cell cutting.

SUMMARY OF THE INVENTION

The present invention has been accomplished in view of the problem in the above conventional examples, and an object of the present invention is to solve the above problem of the instable creation of median crack, thereby providing a substrate cutting method capable of increasing the working yield.

A substrate cutting method of the present invention is a method for cutting a substrate by scribing a scribe line therein, wherein a working condition of the scribe line is varied during scribe working of one line.

A further substrate cutting method of the present invention is a method for scribing at least two scribe lines crossing each other, in the substrate, wherein a working condition of one scribe line is different from that of the other scribe line.

DETAILED DESCRIPTION OF THE PREFERRED EMBODIMENTS

In the substrate cutting method of the present invention, a working condition of a scribe line is varied during working of one scribe line. In another example, for scribing at least two scribe lines crossing each other in a substrate, a working condition of one scribe line is different from that of the other scribe line.

Figure 1:
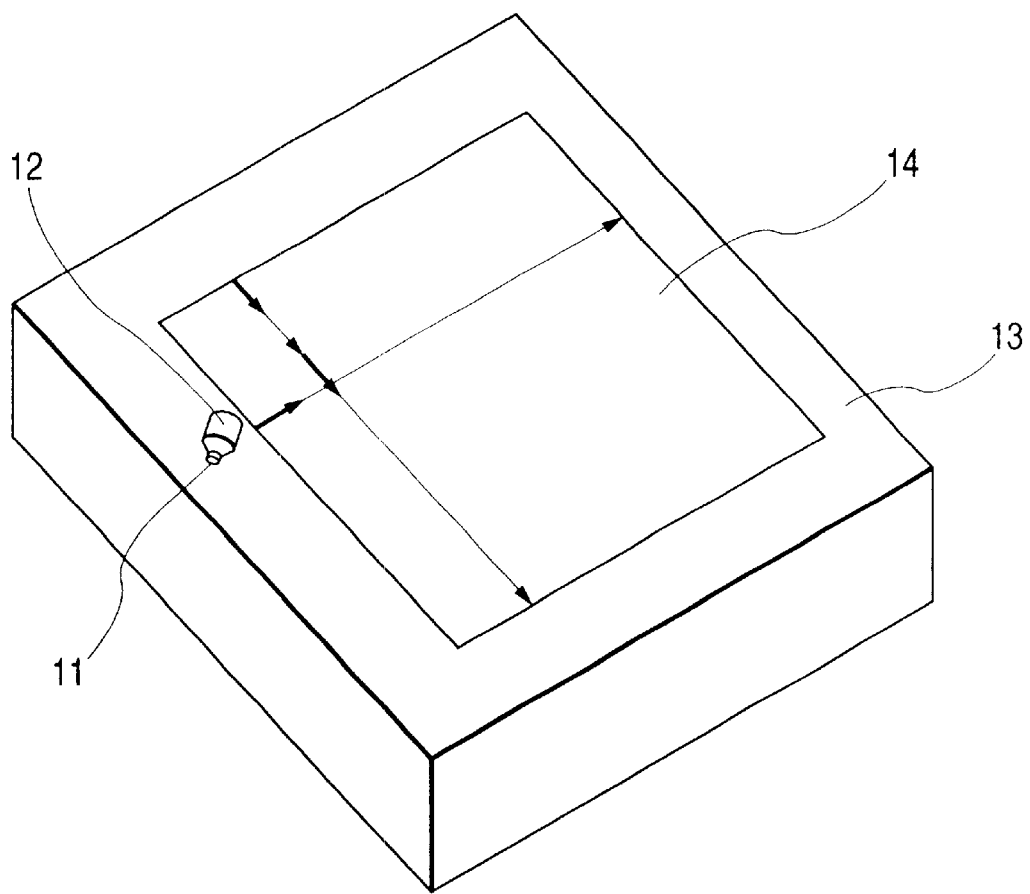
FIG. 1 is a perspective view to show an example of a scribe head and a stage used in the present invention.

The present invention will be described referring to FIG. 1. In FIG. 1, a substrate 14 to be cut is secured on a stage 13 provided with a sucking means. Scribe lines are scribed in the substrate 14 with a scribe head 12 equipped with a scribing cutter 11. The scribe head 12 is constructed to be controlled in the direction of its height by a servo mechanism so as to adjust the scribing depth into the substrate. The pressure at the cutter edge can also be controlled during scribing by an air cylinder. Further, the scribing speed of the scribe head can also be controlled to an arbitrary value. The cutter 11 preferably used is a cutting tool of sintered diamond or ultra high strength steel.

During the scribing of a scribe line a working condition of the scribe line is varied around the edge of the substrate and around a croon point in this structure, so as to allow a median crack to grow properly. For example, the scribing depth of the scribe line is increased preferably around the edge of the substrate and around the cross point; or the pressure of the cutter is increased preferably around the edge of the substrate and around the cross point; or the scribing speed of the cutter is decreased preferably around the edge of the substrate and around the cross point.

When at least two scribe lines crossing each other are scribed in the substrate, the scribing depth of the second scribe line is set larger than that of the first scribe line. In this case, the working condition for scribing of the first scribe line may or may not be varied during the scribe working thereof. Similarly, the pressure of the cutter in scribing of the second scribe line may be get preferably greater than that of the first scribe line. In addition, the scribing speed of the cutter in scribing of the second scribe line may be set preferably smaller than that of the first scribe line.

The preferred range of the scribing depth is preferably 0.07 to 0.27 mm. The pressure of the cutter is preferably in the range of 0.5 to 1.7 kgf/cm$^2$. The scribing speed of the cutter is preferably in the range of 100 to 300 mm/sec. It is preferable to vary the scribing depth, the pressure of the cutter, or the scribing speed of the cutter within the above numerical ranges.

In the present invention, particularly, in the cutting method of the color filter substrate produced by the ink jet method, the working condition, which is either the scribing depth, the pressure, the scribing speed of the cutter, or the like during the scribe working, is set so as to vary during the scribe working of one line, whereby no cutter jump occurs at the cross point, so as to be able to increase the working yield. In another case, the working condition, which is either the scribing depth, the pressure, the scribing speed, or the like, is so set for scribing vertical and horizontal lines that the working condition in the second scribing direction across the cross point is different from that in the first scribing direction, whereby no cutter jump occurs at the cross point, so as to be able to increase the working yield. It is noted that this method also reveals the effect of increasing the working yield similarly in the cutting of the color filter substrates produced by the other methods than the ink jet method.

A method for producing a color filter substrate by the ink jet method will be described below.

For example, the color filter substrate can be produced through a series of steps illustrated in FIGS. 2A to 2F.

The substrate is preferably a transparent substrate, which is normally a glass substrate. However, the substrate is not limited to the glass substrate as long as the substrate has required characteristics including the transparency, mechanical strength, etc. for the liquid crystal color filters.

Figure 2A:
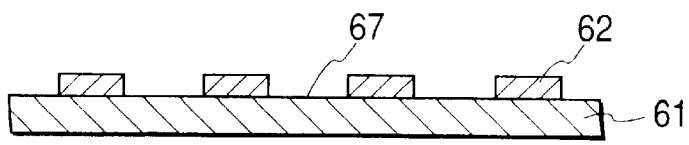
FIGS. 2A, 2B, 2C, 2D, 2E and 2F are step diagrams to show an example of the color filter producing method using the cutting method of the present invention.
Figure 2B:
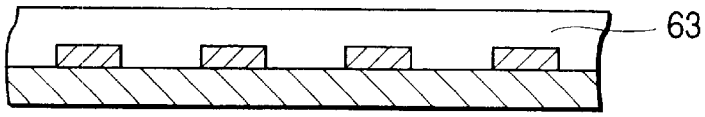

FIG. 2A shows a glass substrate 61 provided with light transmitting portions 67 and a black matrix 62 of shield portions. First, the substrate 61 with the black matrix 62 formed thereon is coated with a resin composition, which is curable by light irradiation or by light irradiation and heating, thereby decreasing ink absorbability, and it is prebaked if necessary, to form a resin layer 63 (FIG. 2B). The resin layer 63 can be made by a coating method such as spin coating, roll coating, bar coating, spray coating, dip coating, or the like, but it should be noted that the forming method of the resin layer 63 is not limited particularly to those.

Figure 2C:
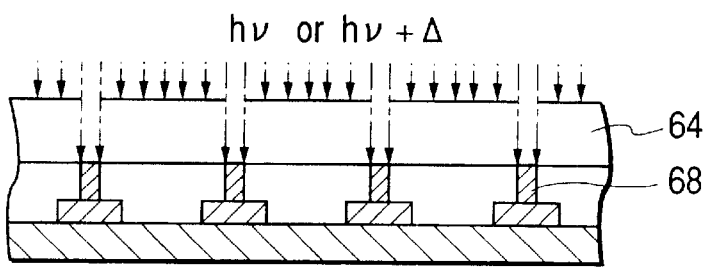
Figure 2D:
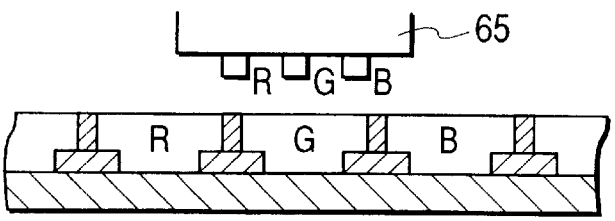

Next, the resin layer on the shield portions of the black matrix 62 is preliminarily subjected to pattern exposure by use of a photomask 64, whereby the resin layer is hardened in part to form portions 68 not absorbing ink (non-colored portions) (FIG. 2C). Thereafter, ink liquids of the respective colors of R, G, and B are delivered into the single layer from an ink jet head 65 (FIG. 2D) and the ink is dried as occasion may demand.

The photomask 64 used in the pattern exposure is one having opening portions for hardening the resin on the shield portions of the black matrix. On this occasion, it is necessary to dispense a relatively large amount of ink in order to prevent colorless part without a coloring agent from appearing in portions in contact with the black matrix. It is thus preferable to use the mask with the opening portions narrower than the (shield) width of the black matrix.

The ink used for coloring can be of either the dye type or the pigment type and it can be selected from liquid ink and solid ink.

The curable resin composition used in the present invention can be any resin composition that has an ink receiving property and that can be cured by at least one of light irradiation and the combination of light irradiation with heating, and the resin can be selected, for example, from acrylic resins; epoxy resins; silicone resins; cellulose derivatives such as hydroxypropyl cellulose, hydroxyethyl cellulose, methyl cellulose, carboxy methyl cellulose, and so on, or modified celluloses therefrom; and so on.

A photoinitiator (cross-linking agent) can also be used in order to initiate the cross-linking reaction of these resins by light or by light and heat. The photoinitiator can be selected from bichromates, bisazides, radical initiators, cationic initiators, anionic initiators, and so on. These photoinitiators can be used in a mixed form or in a combined form with another sensitizer. For advancing the cross-linking reaction further, a heat treatment may also be carried out after the light irradiation.

The resin layer containing these compositions is very excellent in heat resistance, water resistance, etc. and can bear high temperature in a later step, or a cleaning step.

The ink jet method can be selected from the bubble jet type using an electro-thermal transducer as an energy generating element, the piezo jet type using a piezoelectric element, and so on, and the coloring area and coloring pattern can be set arbitrarily.

Figure 2E:
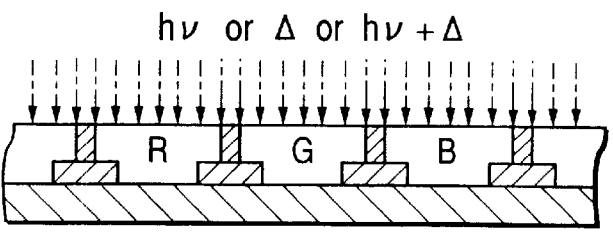

Then the resin composition is cured by light irradiation or by light irradiation and heat irradiation (FIG. 2E). After the curing of the resin composition, color densities of the colored portions are inspected by an inspection method of the present invention. The inspection of color densities does not have to be carried out for all the color filters.

Figure 2F:
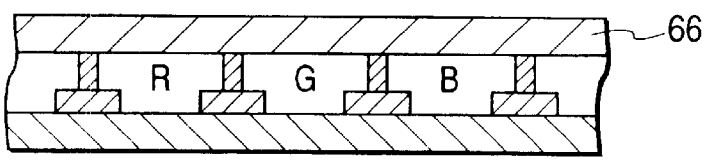
Figure 3A:
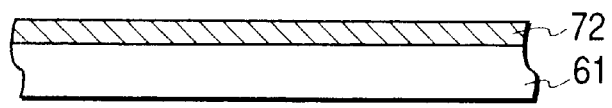
FIGS. 3A, 3B, 3C, 3D and 3E are step diagrams to show another example of the color filter producing method using the cutting method of the present invention.
Figure 3B:
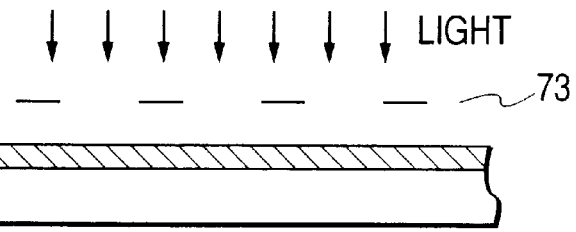
Figure 3C:
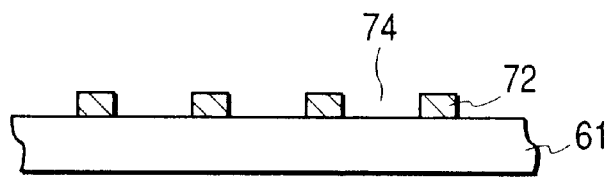
Figure 3D:
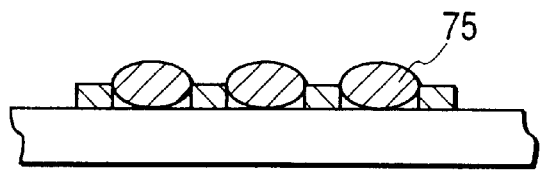
Figure 3E:
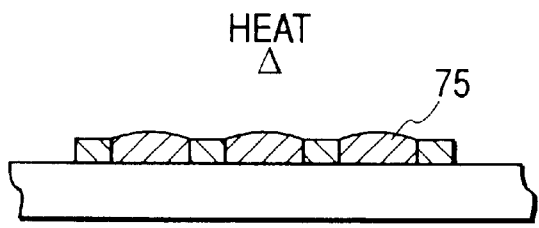

After that, a protective layer 66 is formed as occasion may demand (FIG. 2F). The protective layer 66 can be one made of a second resin composition of the photo-curing type, the thermosetting type, or the photo-thermal curing type, or one made of an inorganic material by evaporation or sputtering. The protective layer 66 can be any film that has transparency in the color filter form and that can resist the ITO forming process, the alignment layer forming process, etc. carried out thereafter.

FIG. 3A to FIG. 3E show another example of the producing method of the color filter substrate.

(a) The transparent substrate 61 is coated with a black, photosensitive resin composition 72. The thickness of the coating film is one enough to achieve the required shield property, which is, for example, about 1 μm. The transparent substrate is often made, for example, of glass, but it may also be a plastic film or a plastic sheet. In order to enhance the adhesion of the transparent substrate to the black matrix and to the coloring ink, a thin film capable of enhancing the adhesion may also be preliminarily formed on the transparent substrate as occasion may demand.

(b) The coating layer is pre-cured, for example, using a hot plate or the like, and is then exposed using an exposure apparatus having the wavelength to which the photosensitive resin composition is sensitive, and using a mask 73 having a predetermined pattern.

(c) Development is then carried out. In the case of the negative type, portions shielded by the mask 73 during the exposure will be dissolved into a developer up to the surface of the substrate and portions exposed to light will remain as a black matrix pattern. Subsequent to it, the substrate is rinsed in order to wash the developer away and then is dried lightly by spin drying, air knife, or the like. After this, the substrate surfaces in spaces 74 of the black matrix become clean.

(d) Ink 75 of the predetermined colors is dispensed into the spaces 74 of the black matrix. The ink dispensing method can be selected from the ordinary printing methods or the like, such as offset printing, gravure printing, screen printing, and so on, but, particularly, the ink jet printing method using an ink jet printer is preferably applicable, because it does not have to use a plate during printing and thus permits high-accuracy patterning only by control of the diameter of ink droplets. The ink used herein is one properly selected from ink materials which are apt to be repelled on the above black matrix pattern but are easy to wet the pixel portions in the spaces of the black matrix. The surface energy (surface tension) is normally in the range of 20 to 70 dyne/cm. Such ink may be of either the dye type or the pigment type and a solvent thereof may contain a hydrophilic, organic solvent or the like in the matrix of water.

It is preferable to use thermosetting ink as the ink, because curing of the ink and final curing of the black matrix can be carried out in a common step.

A thermosetting component in the ink is preferably a material that can be cured under a temperature condition approximately equal to that for the final curing of the black matrix, and it can be selected from acrylic resins, epoxy resins, phenol resins, enthiol, and so on. It can also be selected from materials obtained by adding aromatic amine, acid anhydride, or the like to the above resins according to the process temperature required.

(e) A heating-drying operation (post bake) is carried out for the final curing of the black matrix, thereby forming the black matrix. It is preferable here to also effect the final curing of the ink at the same time.

After the post bake, the color densities of the colored portions are inspected by the inspection method of the present invention. Thereafter, the protective film is formed as occasion may demand.

Figure 4:
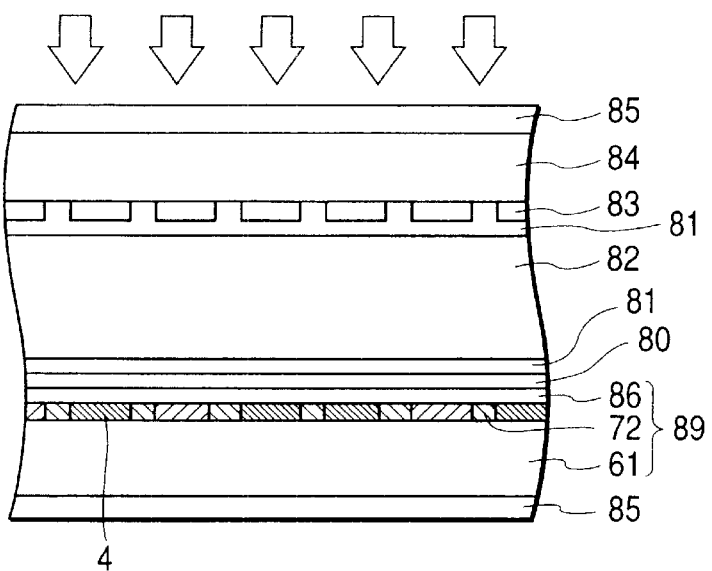
FIG. 4 is a cross-sectional view to show an example of a liquid crystal display device using the cutting method of the present invention.

FIG. 4 shows a cross section of a TFT color liquid-crystal panel incorporating the color filter. It should be noted here that the form of the panel is not limited to the present example.

The color liquid-crystal panel is produced normally by aligning the color filter substrate 61 with an opposed substrate 84 and sealing a liquid-crystal composition 82 in between them. TFTs (not illustrated) and transparent pixel electrodes 83 are formed in a matrix on the internal surface of one substrate 84 of the liquid-crystal panel. On the internal surface of the other substrate 61, the color filter 89 is laid so that the color materials of R, G, and B are arranged at the positions opposite to the pixel electrodes, and a transparent, opposed electrode (common electrode) 80 is formed over the entire surface of the color filter 89. The black matrix is formed normally on the color filter substrate side. Further, alignment films 81 are provided on the inside surfaces of both substrates, and liquid crystal molecules can be aligned in a certain direction by rubbing of the alignment films. A polarizing sheet 85 is bonded to the outside surface of each glass substrate and the liquid crystal compound 82 is filled in the space (about 2 to 5 $\mu$m) between these glass substrates. It is common practice to use a combination of a scattering plate (not illustrated) with a fluorescent lamp (not illustrated) as a back light. The liquid crystal compound works as an optical shutter for varying the transmittance of light from the back light, thereby effecting display. Reference numeral 86 denotes the protective layer.

Figure 5:
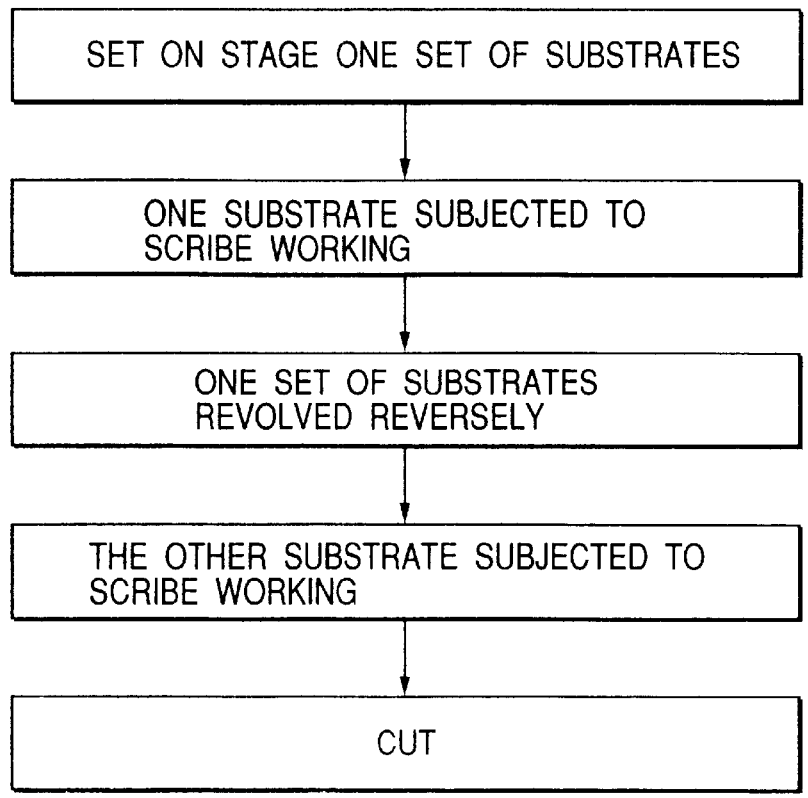
FIG. 5 is a flowchart to show an example of steps of cutting a set of substrates used in the liquid crystal display device.

FIG. 5 shows the step flow in a process in which the substrates are cut after the bonding of the color filter substrate and the opposed substrate. In this case, the substrates are cut before the filling of liquid crystal.

As illustrated in FIG. 5, the two substrates combined are secured on the stage. In this state scribe lines are scribed first in one substrate. Then the two substrates combined are turned over and scribe lines are scribed in the other substrate. Finally, the substrates are cut along the scribe lines.

EXAMPLES

Examples of the present invention will be described referring to the drawings.

Example 1

The color filter substrate, in which the ink receiving layer colored had been laid on the glass substrate, was cut using the scribe head 12 and stage 13 illustrated in FIG. 1. The cutter 11 used herein was an ultra high strength steel roll cutter having a diameter of 5 mm and an included angle of 125°.

In the present example, the scribing depth among the working conditions was set first to 0.22 mm in the range from immediately after the start of scribing to 5 cm, so as to be 0.05 mm larger than that in the successive region. This lessened the phenomenon that the scribe line became instable because of the difference of the chamfer shape at the edge during the scribing, thereby achieving the effect of increasing the working yield. It should be noted that the difference of the working condition is not limited to the values in the example.

Example 2

With the apparatus of the same structure as in Example 1 described above, the pressure among the working conditions of a lateral scribe line scribed first was set to 1.15 kgf/cm$^2$ in the range from immediately after the start of scribing to 5 cm and in the range 5 cm before and after the cross point, so as to be 0.05 kgf/cm$^2$ larger than that in the other scribed regions. The pressure was kept constant at 1.2 kgf/cm$^2$ for a vertical scribe line scribed after the lateral scribe line. This lessened the phenomenon that the scribe line became instable because of the running the cutter onto the upper film due to the difference of the edge treatment during the scribing, and also lessened the cutter jump at the cross point, thereby achieving the effect of increasing the working yield. It should be noted that the difference of the working condition is not limited to the values in the example.

Example 3

The working was carried out in the same manner as in Example 1, except that the cutter 11 used herein was a sintered diamond cutter having the diameter of 2.5 mm and the included angle of 130°. In the present example, the scribing speed during the working among the working conditions was set to 150 mm/sec in the range from immediately after the start of scribing to 5 cm and in the range 5 cm before and after the cross point, so as to be 50 mm/sec smaller than that in the other regions. This lessened the phenomenon that the scribe line became instable because of the running of the cutter onto the upper film due to the difference of the chamfer shape at the edge during the scribing, and also lessened the cutter jump at the cross point, thereby achieving the effect of increasing the working yield. It should be noted that the difference of the working condition is not limited to the values in the example.

Example 4

In the same structure as in Example 3, the working was carried out under such working conditions for the lateral scribe line scribed first that the scribing depth was set to 0.27 mm in the range from immediately after the start of scribing to 5 cm and in the range 5 cm before and after the cross point, so as to be 0.1 mm larger than that in the other scribed regions and that the pressure was set to 1.2 kgf/cm$^2$ in the range from immediately after the start of scribing to 5 cm and in the range 5 cm before and after the cross point, so as to be 0.1 kgf/cm$^2$ larger than that in the other scribed regions. This lessened the cutter jump at the cross point and confirmed the effect of further increasing the working yield. It is also noted that the set values are not limited to those in the above example, as in the foregoing examples.

Example 5

In the same structure as in Example 3, the working was carried out under such working conditions for the lateral scribe line scribed first that the scribing depth was set to 0.27 mm in the range from immediately after the start of scribing to 5 cm and in the range 5 cm before and after the cross point, so as to be 0.1 mm larger than that in the other scribed regions and that the scribing speed during the scribing was set to 170 mm/sec in the range from immediately after the start of scribing to 5 cm and in the range 5 cm before and after the cross point, so as to be 30 mm/sec smaller than that in the other scribed regions. This lessened the cutter jump at the cross point and confirmed the effect of further increasing the working yield. It is also noted that the set values are not limited to those in the above example, as in the foregoing examples.

Example 6

In the same structure as in Example 3, the working was carried out under such working conditions for the lateral scribe line scribed first that the pressure was set to 1.2 kgf/cm$^2$ in the range from immediately after the start of scribing to 5 cm and in the range 5 cm before and after the cross point, so as to be 0.1 kgf/cm$^2$ larger than that in the other scribed regions and that the scribing speed during the scribing was set to 170 mm/sec in the range from immediately after the start of scribing to 5 cm and in the range 5 cm before and after the cross point, so as to be 30 mm/sec smaller than that in the other scribed regions. This lessened the cutter jump at the cross point and confirmed the effect of further increasing the working yield. It is also noted that the set values are not limited to those in the above example, as in the foregoing examples.

Example 7

In the same structure as in Example 3, the working was carried out under such working conditions for the lateral scribe line scribed first that the scribing depth was set to 0.27 mm in the range from immediately after the start of scribing to 5 cm and in the range 5 cm before and after the cross point, so as to be 0.1 mm larger than that in the other scribed regions, that the pressure was set to 1.2 kgf/cm$^2$ in the range from immediately after the start of scribing to 5 cm and in the range 5 cm before and after the cross point, so as to be 0.1 kgf/cm$^2$ larger than that in the other scribed regions, and that the scribing speed during the scribing was set to 170 mm/sec in the range from immediately after the start of scribing to 5 cm and in the range 5 cm before and after the cross point, so as to be 30 mm/sec smaller than that in the other scribed regions. This lessened the cutter jump at the cross point and confirmed the effect of further increasing the working yield. It is also noted that the set values are not limited to those in the above example, as in the foregoing examples.

Example 8

Using the apparatus of the same structure and the same color filter substrate as in Example 1, the set value of the scribing depth for the vertical scribe line scribed after was set to be 0.1 mm greater than that (0.17 mm) for the lateral scribe line scribed first. This lessened the cutter jump at the cross point and achieved the effect of increasing the working yield. It is also noted that the difference of the working condition is not limited to the values in this example, and there will arise no problem as long as the set value for the vertical scribe line scribed after is set to be greater than that for the lateral scribe line scribed first.

Example 9

Using the apparatus of the same structure as in Example 1, the set value of the pressure among the working conditions for the vertical scribe line scribed after was set to be 0.1 kgf/cm$^2$ greater than that (1.1 kgf/cm$^2$) for the lateral scribe line scribed first. This lessened the cutter jump at the cross point and confirmed the effect of increasing the working yield. It is also noted that the difference of the working condition is not limited to the values in this example, and there will arise no problem as long as the set value for the vertical scribe line scribed after is set to be greater than that for the lateral scribe line scribed first.

Example 10

Using the apparatus of the same structure as in Example 3, among the working conditions the set value of the scribing speed during the scribing for the lateral scribe line scribed first was set to 200 mm/sec and that for the vertical scribe line scribed after to 170 mm/sec. This lessened the cutter jump at the cross point and confirmed the effect of increasing the working yield. It is also noted that the difference of the working condition is not limited to the values in this example, and there will arise no problem as long as the set value for the vertical scribe line scribed after is set to be smaller than that for the lateral scribe line scribed first.

Example 11

In the same structure as in Example 3, the working was carried out under such working conditions that the set value of the scribing depth for the vertical scribe line scribed after was set to be 0.1 mm greater than that (0.17 mm) for the lateral scribe line scribed first and that the set value of the pressure for the vertical scribe line scribed after was set to be 0.1 kgf/cm$^2$ larger than that (1.1 kgf/cm$^2$) for the lateral scribe line scribed first. This lessened the cutter jump at the cross point and confirmed the effect of further increasing the working yield. It is also noted that the set values are not limited to those in the above example, as in the foregoing examples.

Example 12

In the same structure as in Example 3, the working was carried out under such working conditions that the set value of the scribing depth for the vertical scribe line scribed after was set to be 0.1 mm greater than that (0.17 mm) for the lateral scribe line scribed a first and that the set value of the scribing speed during the scribing for the lateral scribe line scribed first was set to 200 mm/sec and that for the vertical scribe line scribed after to 170 mm/sec. This lessened the cutter jump at the cross point and confirmed the effect of further increasing the working yield. It is also noted that the set values are not limited to those in the above example, as in the foregoing examples.

Example 13

In the same structure as in Example 3, the working was carried out under such working conditions that the set value of the pressure for the vertical scribe line scribed after was set to be 0.1 kgf/cm$^2$ larger than that (1.1 kgf/cm$^2$) for the lateral scribe line scribed first and that the set value of the scribing speed during the scribing for the lateral scribe line scribed first was set to 200 mm/sec and that for the vertical scribe line scribed after to 170 mm/sec. This lessened the cutter jump at the cross point and confirmed the effect of further increasing the working yield. It is also noted that the set values are not limited to those in the above example, as in the foregoing examples.

Example 14

In the game structure as in Example 3, the working was carried out under such working conditions that the set value of the scribing depth for the vertical scribe line scribed after was set to be 0.1 mm greater than that (0.17 mm) for the lateral scribe line scribed first, that the set value of the pressure for the vertical scribe line scribed after was set to be 0.1 kgf/cm$^2$ larger than that (1.1 kgf/cm$^2$) for the lateral scribe line scribed first, and that the set value of the scribing speed during the scribing for the lateral scribe line scribed first was set to 200 mm/sec and that for the vertical scribe line scribed after to 170 mm/sec. This lessened the cutter jump at the cross point and confirmed the effect of further increasing the working yield. It is also noted that the set values are not limited to those in the above example, as in the foregoing examples.

As described above, the present invention increases the working yield while eliminating the phenomenon that the scribe line becomes instable because of the running of the cutter onto the upper film due to the difference of the edge treatment during scribing, and also eliminating the cutter jump at the cross point, particularly, in the cutting method of the color filter substrate produced using the ink jet method. This method also has the effect of increasing the working yield similarly in the cutting work of the color filter substrates produced by other methods than the ink jet method.

What is claimed is:

1. A method for cutting a substrate by scribing a scribe line in the substrate, wherein, in scribing at least two crossing scribe lines in the substrate, with a scribing speed for the two scribe lines being different from each other, the scribing speed for a scribing line formed by a following scribing is smaller.

2. The method according to claim 1, wherein the scribing speed is in the range of 100 to 300 mm/sec.

* * * * *

UNITED STATES PATENT AND TRADEMARK OFFICE
CERTIFICATE OF CORRECTION

PATENT NO.   : 6,386,084 B1
DATED        : May 14, 2002
INVENTOR(S)  : Naoki Kato It is certified that error appears in the above-identified patent and that said Letters Patent is hereby corrected as shown below:

Column 2,
Line 54, "croon" should read -- cross --.

Column 3,
Line 1, "get" should read -- set --.

Column 9,
Line 17, "game" should read -- same --.

Signed and Sealed this

First Day of October, 2002

Attest:

Attesting Officer

JAMES E. ROGAN
Director of the United States Patent and Trademark Office